United States Patent
Kurita et al.

(10) Patent No.: US 8,300,337 B2
(45) Date of Patent: Oct. 30, 2012

(54) DISK DRIVE AND METHOD FOR MEASURING CLEARANCE CHANGE IN THE DISK DRIVE

(75) Inventors: Masayuki Kurita, Kanagawa (JP); Kenji Kuroki, Kanagawa (JP); Kenichi Kuramoto, Kanagawa (JP); Yoshihiko Maeda, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/558,435

(22) Filed: Sep. 11, 2009

(65) Prior Publication Data
US 2011/0102933 A1 May 5, 2011

(30) Foreign Application Priority Data
Sep. 11, 2008 (JP) ................................ 2008-234062

(51) Int. Cl.
*G11B 27/36* (2006.01)
*G11B 21/02* (2006.01)
(52) U.S. Cl. .......................................... 360/31; 360/75
(58) Field of Classification Search .................. None
See application file for complete search history.

(56) References Cited

U.S. PATENT DOCUMENTS

| 5,923,485 | A | 7/1999 | Ito |
| 7,196,860 | B2 | 3/2007 | Alex |
| 7,492,543 | B2* | 2/2009 | Mitsunaga et al. ............. 360/75 |
| 2004/0136105 | A1* | 7/2004 | Ma et al. ......................... 360/31 |
| 2007/0230015 | A1 | 10/2007 | Yamashita et al. |
| 2007/0230034 | A1* | 10/2007 | Kondo ........................ 360/78.04 |
| 2009/0141391 | A1* | 6/2009 | Kuramoto et al. ............. 360/75 |

FOREIGN PATENT DOCUMENTS

| JP | 10-255202 | 9/1998 |
| JP | 2002-133769 | 5/2002 |
| JP | 2007-087490 | 4/2007 |

* cited by examiner

*Primary Examiner* — Regina N Holder

(57) ABSTRACT

A method for measuring change of clearance between a head and a disk. The method includes reading a preliminarily written data string for clearance measurement on a disk to obtain a first measured value corresponding to a clearance, and writing a new data string for deterioration check onto the disk and reading the data string for deterioration check to obtain a second measured value corresponding to the clearance. The method also includes determining a deterioration of the data string for clearance measurement from a difference between the first measured value and the second measured value, measuring a clearance change using the data string for clearance measurement by a normal operation if the determination is that the data string for clearance measurement has not deteriorated, and measuring a clearance change by an operation different from the normal operation if the determination is that the data string for clearance measurement has deteriorated.

18 Claims, 6 Drawing Sheets

DISK DRIVE AND METHOD FOR MEASURING CLEARANCE CHANGE IN THE DISK DRIVE

CROSS-REFERENCE TO RELATED APPLICATION

This application claims priority from the Japanese Patent Application No. 2008-234062, filed Sep. 11, 2008, the disclosure of which is incorporated herein in its entirety by reference.

TECHNICAL FIELD

Embodiments of the present invention relate to a disk drive and a method for measuring a clearance change in the disk drive.

BACKGROUND

Disk drives using various kinds of disks, such as optical disks, magneto-optical disks, flexible magnetic-recording disks, and similar disks for data-storage are known in the art. In particular, hard-disk drives (HDDs) have been widely used as data-storage devices that have proven to be indispensable for contemporary computer systems. Moreover, HDDs have found widespread application to motion picture recording and reproducing apparatuses, car navigation systems, cellular phones, and similar devices, in addition to computers, due to their outstanding information-storage characteristics.

Magnetic-recording disks used in HDDs have multiple concentric data tracks and servo tracks. Each servo track includes a plurality of servo-data patterns containing address information. Each data track includes multiple data sectors containing user data recorded thereon. Data sectors are recorded between the servo data located at discrete locations along the circumferential direction of a track. A magnetic-recording head incorporated in head-slider supported by a rotary actuator accesses a desired data sector of a track determined by address information contained in the servo data to write data to, or alternatively, to read data from, the data sector.

To increase the recording density of a magnetic-recording disk, the clearance, which is identified with the term of art, "fly-height," between the magnetic-recording head flying over the magnetic-recording disk and the magnetic-recording disk has been progressively decreasing. Moreover, magnetic-recording technology continues to develop procedures both to control the clearance, and to suppress variations in the clearance. One such procedure, referred to by the term of art, "thermal fly-height control" (TFC), utilizes a heater in the head-slider to adjust the clearance. TFC generates heat through Joule heating to make the magnetic-recording head protrude in response to thermal expansion of the head-slider. Protrusion decreases the clearance between the magnetic-recording disk and the magnetic-recording head. Other procedures are also known in the art, for example, procedures that use a piezo element, or Coulomb force, to adjust the clearance between the magnetic-recording disk and the magnetic-recording head. Engineers and scientists engaged in the development of magnetic-recording technology are interested in further developing such procedures to control the fly-height of magnetic-recording heads in HDDs upon which the increased recording densities demanded by the marketplace depends.

SUMMARY

Embodiments of the present invention include a method for measuring a change of a clearance between a head and a disk. The method includes reading a preliminarily written data string for clearance measurement on a disk to obtain a first measured value corresponding to a clearance, and writing a new data string for deterioration check onto the disk and reading the data string for deterioration check to obtain a second measured value corresponding to the clearance. The method also includes determining a deterioration of the data string for clearance measurement from a difference between the first measured value and the second measured value, measuring a clearance change using the data string for clearance measurement by a normal operation if the determination is that the data string for clearance measurement has not deteriorated, and measuring a clearance change by an operation different from the normal operation if the determination is that the data string for clearance measurement has deteriorated.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
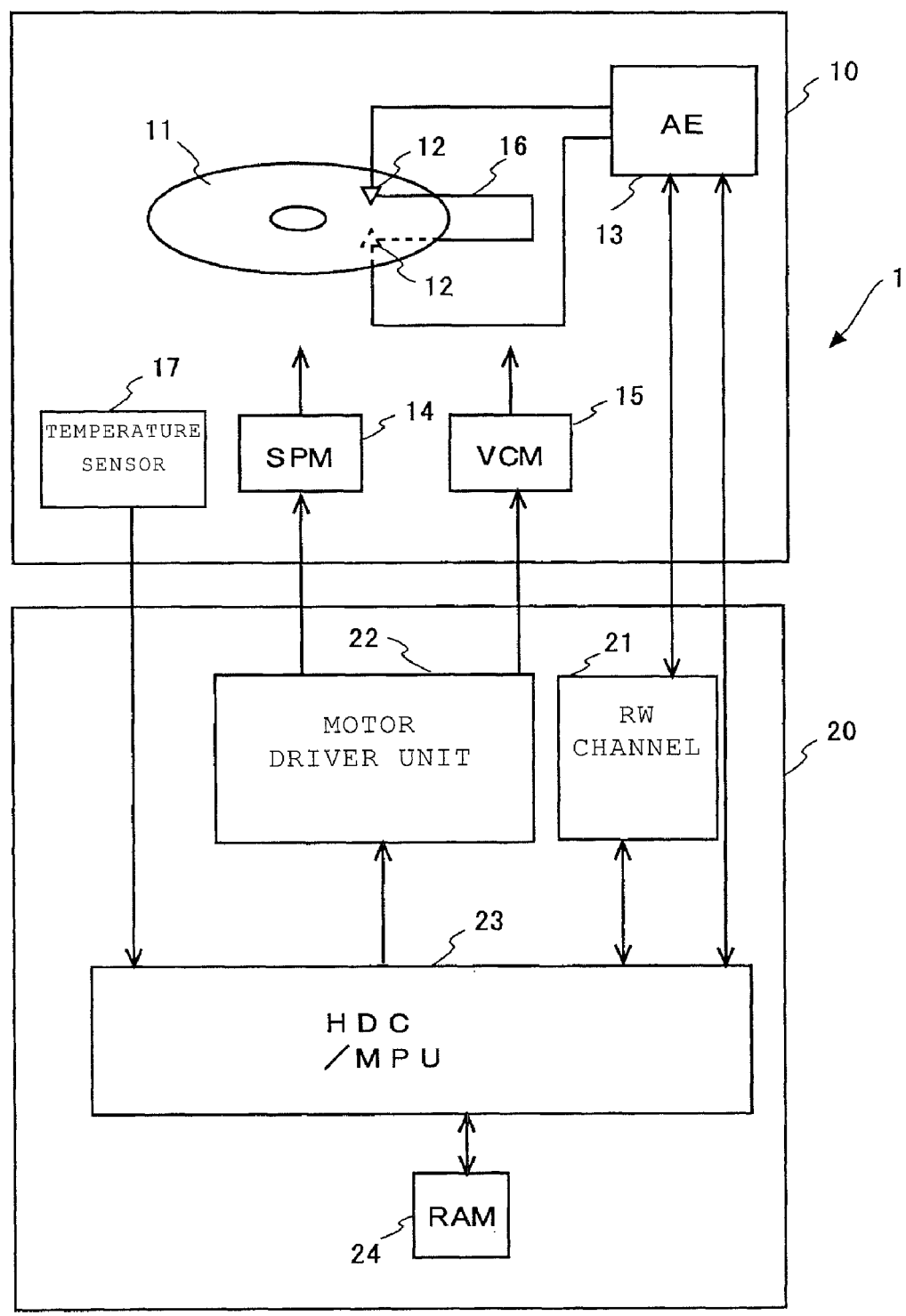
FIG. 1 is a block diagram schematically illustrating an example configuration of an HDD 1, in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary. Description of Embodiments of the Present Invention for a Disk Drive and a Method for Measuring Clearance Change in the Disk Drive In accordance with embodiments of the present invention, the clearance varies with temperature, as well as with barometric pressure, which is a function of altitude. For more precise clearance adjustment, the clearance may be adjusted depending on the barometric pressure. As the pressure falls, the clearance between the magnetic-recording head and the magnetic-recording disk decreases. Accordingly, a hard-disk drive (HDD) controls a clearance adjustment mechanism to maintain the clearance constant in such a manner that, if the pressure did not change, the clearance would increase with the pressure drop, associated with an increase in altitude.

In accordance with further embodiments of the present invention, a typical HDD includes a temperature sensor as a means to sense the temperature, because the operation of a HDD depends considerably on the temperature. An HDD can utilize the temperature sensed by the temperature sensor for clearance adjustment. Similarly, a barometric sensor, which may serve as an altitude sensor, is also known in the art as a means for sensing the pressure. However, use of a barometric sensor increases the number of components in the HDD and also the cost of the HDD considerably. Since the clearance varies with pressure, as mentioned above, the HDD can measure a pressure change using a clearance change. The HDD adjusts the clearance with the temperature sensed by the temperature sensor and the pressure information calculated from the clearance change.

In accordance with further embodiments of the present invention, in addition to a change in pressure, a drastic change in humidity and changes over time of the internal structure of, for example, an actuator, or alternatively, head-sliders within the HDD, may cause a clearance change. To control the clearance with more accuracy, a clearance change caused by factors other than temperature and pressure is determined, and the clearance is adjusted based on the clearance change. To this end, the HDD measures and checks the clearance, or alternatively, a clearance change, periodically.

In accordance with further embodiments of the present invention, HDDs encounter several situations in which the clearance, or alternatively, the clearance change, is measured. Some techniques to measure the clearance are known in the art. One effective technique is to determine the clearance, or alternatively, the clearance change, from the amplitude of read-back signals from the magnetic-recording head. In general, as the clearance decreases, the signal intensity of a read-back signal increases; as the clearance increases, the signal intensity of a read-back signal decreases. Referring to the change in signal intensity allows measurement of a clearance, or alternatively, the clearance change. A clearance-measurement method using the signal intensity of read-back signals may employ the gain setting of a variable-gain amplifier. As the signal intensity of read-back signals increases, the gain setting of the variable-gain amplifier decreases. Hence, a HDD can determine the signal intensity and the clearance by employing the gain setting of the variable-gain amplifier.

In accordance with other embodiments of the present invention, as an alternative method for more precise clearance measurement than the clearance measurement that employs the gain setting of a variable-gain amplifier, a method is known in the art that determines the clearance from the resolution of frequency components in read-back signals. The resolution can be expressed by the ratio between a specific low frequency component and a specific high frequency component in read-back signals; and, the measurement using resolution is one of the clearance measurement methods using the signal intensity of read-back signals. As the clearance decreases, the amplitude of a high frequency component in a read-back signal increases compared with an amplitude of a low frequency component so that the resolution increases. On the other hand, as the clearance increases, the amplitude of high frequency component of read-back signals decreases compared with the amplitude of low frequency component so that the resolution decreases.

In accordance with embodiments of the present invention, to measure a clearance with read-back signals, a read element reads a data string on a magnetic-recording disk. The data string for clearance measurement is a data string which is suitable for the measurement method, and may have been preliminarily written on a magnetic-recording disk in the course of manufacturing the HDD, or alternatively, may be written with a write element at every clearance measurement. On the other hand, the inventors have found that the data strings written in manufacturing the HDD differ considerably from the data strings written by the HDD at every clearance measurement in variation of the clearance measurement.

Figure 6:
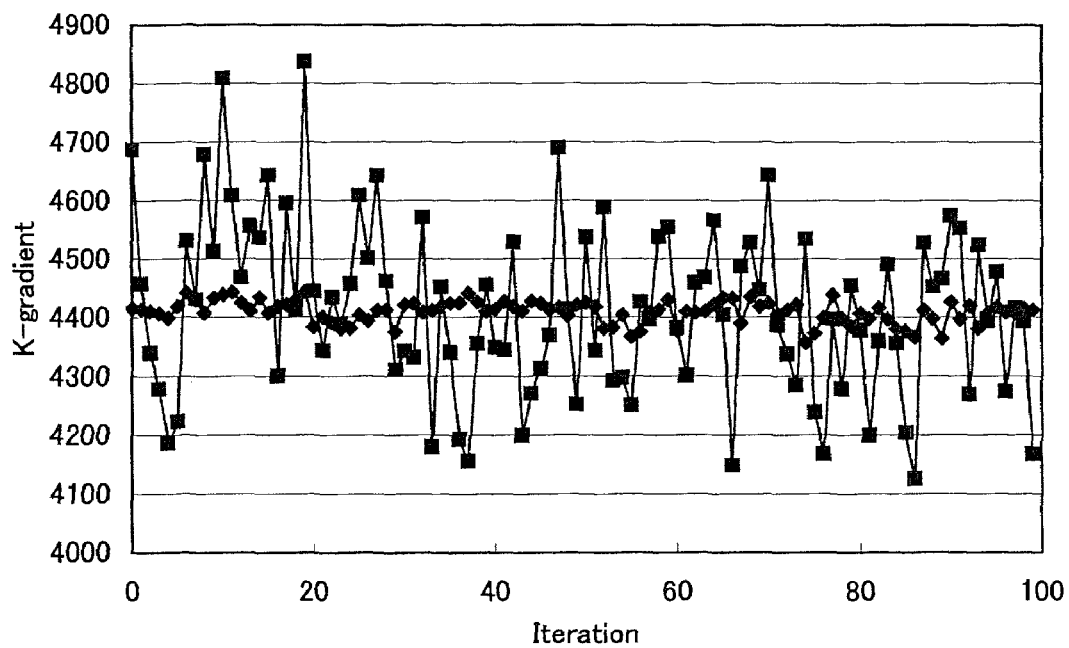
FIG. 6 is a graph illustrating example variations in measured Kgrad using the same data string and in measured Kgrad using a new data string which has been written at every measurement, in accordance with an embodiment of the present invention.

With reference now to FIG. 6, in accordance with embodiments of the present invention, a graph is shown that indicates measured resolutions when a once written data string for measurement is iteratively read (squares) and when a data string for measurement are iteratively written and read at every measurement (diamonds). The horizontal axis represents the number of measurements (the sequence of measurement), and the vertical axis represents the resolution. As shown in FIG. 6, when a write and read of the data string for clearance measurement are repeated, the variation in measurement is larger than when the same data string for measurement is repetitively read. FIG. 6 indicates measured resolutions with respect to a specific identical data string. Accordingly, for more precise clearance measurement, in an embodiment of the present invention, the data string, which has once been written, is iteratively used for measurement. Moreover, the repetitive use of the same data string for measurement raises issues other than the variation in measurement, for example, thermal demagnetization. The magnetization direction on a magnetic-recording disk varies with thermal energy. Hence, after a long operating time of a HDD, changes may occur in respective magnetization directions of data in the data string for measurement so that the read-back signal amplitude, upon which the clearance measurement depends, also may change.

In accordance with embodiments of the present invention, as described above, resolution may be expressed by the ratio between the low frequency signal amplitude and the high frequency signal amplitude. If the low frequency signal amplitude and the high frequency signal amplitude decrease in the same manner because of thermal demagnetization, the resolution is constant. The effect of the thermal demagnetization, however, is different depending on the frequency of the data string. Specifically, typically, if recording magnetization occurs in the in-plane direction, the amplitude of a high frequency drastically decreases, and if recording magnetization occurs in the direction vertical to the plane, the amplitude of a low frequency drastically decreases.

In accordance with embodiments of the present invention, an inaccurate clearance measurement causes improper clearance adjustment; too small a clearance may cause a head-disk contact to damage a head-slider, or a magnetic-recording disk; or alternatively, reading and writing with insufficient clearance margin may cause a hard error, which is an unrecoverable error, by a head-disk contact. In contrast, too large a clearance may cause a write error. Thus, embodiments of the present invention reduce the variation in clearance measurement using read-back signals and prevent measurement errors caused by thermal demagnetization of the data string for clearance measurement on the magnetic-recording disk.

Embodiments of the present invention include a method for measuring a change of a clearance between a head and a disk. In accordance with embodiments of the present invention, the method reads a preliminarily written data string for clearance measurement on a disk to obtain a first measured value corresponding to a clearance, writes a new data string for deterioration check onto the disk and reads the data string for deterioration check to obtain a second measured value corresponding to a clearance, determines the deterioration of the data string for clearance measurement from the difference between the first measured value and the second measured value, measures a clearance change using the data string for clearance measurement by a normal operation if the determination is that the data string for clearance measurement has not deteriorated, and measures a clearance change by an operation different from the normal operation if the determination is that the data string for clearance measurement has deteriorated. Thus, measuring a clearance change by an operation different from a normal operation if the determination is that the data string for clearance measurement has deteriorated provides a more precise clearance measurement.

In an embodiment of the present invention, if the determination is that the data string for clearance measurement has deteriorated, computations for calculating a clearance change using the data string for clearance measurement are corrected and the corrected computations are used in measuring the clearance change. Thus, a more precise clearance measurement is provided in an efficient operation. In another embodiment of the present invention, the computations are corrected so as to compensate for a portion of the difference between the first measured value and the second measured value. Thus, an excessive correction is prevented that might cause a measurement error.

In an embodiment of the present invention, a new data string for clearance measurement is written onto the disk, if the determination is that the data string for clearance measurement has deteriorated. The new data string allows a more precise clearance measurement. In an embodiment of the present invention, the new data string for clearance measurement is written onto the disk, if specific write conditions have been satisfied. As described herein, a condition may also be referred to as a requirement. Thus, a new data string for clearance measurement may be written under a more appropriate condition.

In an embodiment of the present invention, the ratio of different frequency components in the data string for clearance is measured to measure a clearance change using the ratio. Thus, a more precise clearance measurement is provided with the data string for clearance measurement.

In an embodiment of the present invention, the first measured value and the second measured value are independent of the clearance in the writing of the data string for clearance measurement and the clearance in the writing of the data string for deterioration check. Thus, a more precise deterioration check may be provided. In an embodiment of the present invention, such values indicate clearances in physical distance.

In an embodiment of the present invention, the determination of the deterioration is performed by using a plurality of the first measured values and a plurality of the second measured values. Thus, accuracy in determination may be increased. Moreover, in an embodiment of the present invention, the deterioration of the data string for clearance measurement is verified by measuring a clearance with the head in contact with the disk. Thus, accuracy in determination may also be increased.

In accordance with other embodiments of the present invention, a disk drive includes a write element configured to write a new data string for deterioration check onto a disk, a read element configured to read a preliminarily written data string for clearance measurement on a disk and the data string for deterioration check, a moving mechanism that supports a head including the write element and the read element and configured to move the head in proximity to the recording surface of the disk, and a controller configured to control the moving mechanism and the head. The controller is configured to obtain a first measured value corresponding to a clearance based on read-back signals in the data string for clearance measurement, is configured to obtain a second measured value corresponding to a clearance based on read-back signals in the data string for deterioration check, is configured to determine the deterioration of the data string for clearance measurement by comparing the first measured value with the second measured value, is configured to measure a clearance change using the data string for clearance measurement in a normal operation if the determination is that the data string for clearance measurement has not deteriorated, and is configured to measure a clearance change in an operation different from the normal operation if the determination is that the data string for clearance measurement has deteriorated. Thus, measuring a clearance change by an operation different from a normal operation if the determination is that the data string for clearance measurement has deteriorated provides a more precise clearance measurement. Thus, in accordance with embodiments of the present invention, reading data strings on a disk provides a more accurate measurement of a clearance change.

Hereinafter, embodiments of the present invention are subsequently described by way of example of a HDD, which is an example of a disk drive, without limitation thereto. In accordance with embodiments of the present invention, an HDD adjusts the clearance between a magnetic-recording head and a magnetic-recording disk with a heater element, which is an example of a clearance adjustment mechanism. In accordance with embodiments of the present invention, the clearance control procedure, referred to herein by the term of art, "thermal fly-height control" (TFC), is used to control protrusion of a magnetic-recording head by heat from the heater element within the head-slider. A change in the amount of heat from the heater in the head-slider causes change in thermal expansion of the magnetic-recording head to allow the clearance adjustment.

In accordance with embodiments of the present invention, a HDD reads a data string for clearance measurement on the magnetic-recording disk with a read element and measures a clearance, which is indicative of a clearance change, using the amplitude. In one embodiments of the present invention, the HDD uses two data strings. One is a data string for clearance measurement to measure the clearance, which is indicative of the clearance change, and the other is a data string for checking deterioration of the data string for clearance measurement. The HDD performs the clearance measurement using the same data string for clearance measurement until the deterioration reaches a specific level. On the other hand, the HDD writes a new data string for deterioration check at every check.

In accordance with embodiments of the present invention, the use of the same data string for clearance measurement suppresses the variation in clearance measurement, and writing a data string for deterioration check at every check allows more accurate detection of deterioration of the data string for clearance measurement. Before describing details of the clearance measurement in accordance with embodiments of the present invention, the configuration of the HDD is next described.

With reference now to FIG. 1, in accordance with an embodiment of the present invention, a block diagram is shown that schematically depicts an example configuration of HDD 1. HDD 1 includes a magnetic-recording disk 11, which is a type of data-storage disk, inside a disk enclosure (DE) 10. The use of a magnetic-recording disk and a magnetic-recording head in a HDD is by way of example without limitation thereto, as the use of other data-storage disks and heads in a disk drive is within the spirit and scope of embodiments of the present invention. A spindle motor (SPM) rotates the magnetic-recording disk 11 at a specific angular rate. Head-sliders 12 are provided to access the magnetic-recording disk 11; each of the head-sliders 12 corresponds to a respective recording surface of a magnetic-recording disk 11. As used herein, "access" is a term of art that refers to operations in seeking a data track of a magnetic-recording disk and positioning a magnetic-recording head on the data track for both reading data from, and writing data to, a magnetic-recording disk. Each head-slider 12 includes a slider for flying over the magnetic-recording disk 11 and a magnetic-recording head that is affixed to a slider (see FIG. 2) and converts magnetic signals to and from electrical signals.

With further reference to FIG. 1, in accordance with an embodiment of the present invention, a head-slider 12 includes a heater for TFC to make the magnetic-recording head expand and protrude by heat and adjust the clearance, which is identified herein with the term of art, "fly-height," between the magnetic-recording head and the magnetic-recording disk 11. The structure of the head-slider 12 is subsequently described in detail with reference to FIG. 2. Head-sliders 12 are fixed to a distal end of an actuator 16. The actuator 16, which is coupled to a voice coil motor (VCM) 15, rotates on a pivot shaft to move the head-sliders 12 in proximity to a recording surface of the rotating magnetic-recording disk 11 in a nominally radial direction of the rotating magnetic-recording disk 11. The actuator 16 and the VCM 15 are moving mechanisms for movement of the head-sliders 12 in proximity to the rotating magnetic-recording disk 11.

With further reference to FIG. 1, in accordance with an embodiment of the present invention, on a circuit board 20 outside the DE 10, circuit elements are mounted. A motor driver unit 22 drives the SPM 14 and the VCM 15 in accordance with control data from a head-disk controller/microprocessor unit (HDC/MPU) 23. A random access memory (RAM) 24 functions as a buffer for temporarily storing read data and write data. An arm electronics (AE) module 13 inside the DE 10 selects a head-slider 12 to access the magnetic-recording disk 11 from multiple head-sliders 12, amplifies read-back signals from the head-sliders 12, and sends the read-back signals to a read-write channel (RW channel) 21. In addition, the AE module 13 sends write signals from the RW channel 21 to the selected head-slider 12. The AE module 13 further supplies the heater of the selected head-slider 12 with electrical power and functions as an adjuster circuit for adjusting the electrical power supplied to the heater.

With further reference to FIG. 1, in accordance with an embodiment of the present invention, the RW channel 21, in a read operation, amplifies read-back signals supplied from the AE module 13 to have a specific amplitude, extracts data from the obtained read-back signals, and decodes them. The read data includes user data and servo data. The decoded read user data and servo data are supplied to the HDC/MPU 23. The RW channel 21, in a write operation, code-modulates write data supplied from the HDC/MPU 23, converts the code-modulated data into write signals, and then supplies the write signals to the AE module 13.

With further reference to FIG. 1, in accordance with an embodiment of the present invention, the HDC/MPU 23, an example of a controller, performs complete control of the HDD 1 in addition to other processes concerning data processing, for example, reading and writing operation control, command execution order management, positioning control of the head-sliders 12 using servo signals, which provide servo control, interface control to and from a host (not shown), defect management, and error handling when any error has occurred. In particular, in accordance with an embodiment of the present invention, the HDC/MPU 23 performs TFC depending on the temperature in accordance with the temperature sensed by a temperature sensor 17, and further performs TFC depending on the pressure. Moreover, for accurate TFC, the HDC/MPU 23 reads data from the magnetic-recording disk to measure the clearance. Embodiments of the present invention include operations of the clearance control, which are subsequently described in detail.

Figure 2:
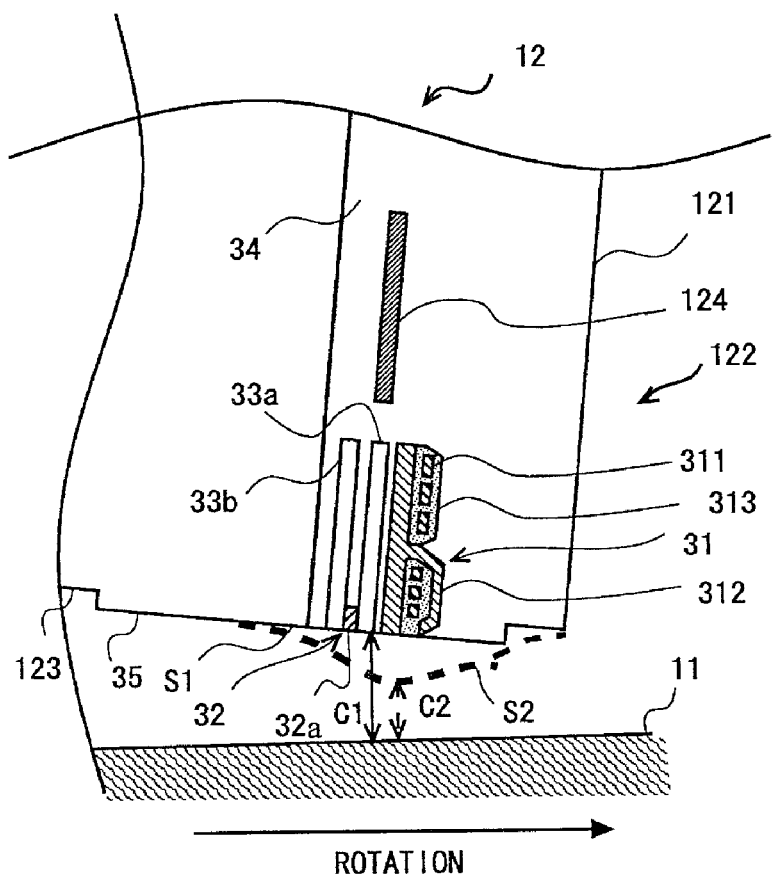
FIG. 2 is a cross-sectional elevation view schematically illustrating an example configuration of a head-slider having a heater for thermal fly-height control (TFC), in accordance with an embodiment of the present invention.

With reference now to FIG. 2, in accordance with an embodiment of the present invention, a cross-sectional view is shown that schematically illustrates a configuration in the vicinity of trailing-edge surface 121 of a head-slider 12. A slider 123 supports a magnetic-recording head 122. The magnetic-recording head 122 includes a read element 32 and a write element 31. The write element 31 generates a magnetic field between magnetic poles 312 by means of electrical current flowing through a write coil 311 to write magnetic data onto the magnetic-recording disk 11. The read element 32 includes a magnetoresistive element 32a having magnetic anisotropy and reads magnetic data by means of resistance variations within the magnetoresistive element 32a in response to the magnetic field emanating from the magnetic-recording disk 11.

With further reference to FIG. 2, in accordance with an embodiment of the present invention, the magnetic-recording head 122 is formed by a thin-film deposition process on an aluminum titanium carbide (AlTiC) wafer substrate, which is subsequently diced to provide the slider 123. The magnetoresistive element 32a is disposed between magnetic shields 33a and 33b. The write coil 311 is surrounded by an insulating film 313. A protective film 34 is provided around the write element 31 and the read element 32. A heater 124 is placed in the vicinity of the write element 31 and the read element 32. The heater 124 may be, for example, a winding thin-film resistive element.

With further reference to FIG. 2, in accordance with an embodiment of the present invention, when the AE module 13 supplies the heater 124 with electrical current, which provides electrical power, the magnetic-recording head 122 is deformed to protrude by the heat produced by the heater 124. For example, in a non-heating state, the shape of the air bearing surface (ABS) 35 of the head-slider 12 is indicated by S1 and the clearance which is a distance between the magnetic-recording head 122 and the magnetic-recording disk is indicated by C1. In a heating state, the protruding shape S2 produced by the heater 124 is indicated by a dashed line. The magnetic-recording head 122 comes close to the magnetic-recording disk 11 and the clearance C2, in the heating state, is less than the clearance C1, in the non-heating state. The amount of protrusion of the magnetic-recording head 122 and the clearance vary with the heater-power value supplied to the heater 124. FIG. 2 is a conceptual view and dimensions of FIG. 2 are not rigidly defined.

With further reference to FIG. 2, in accordance with an embodiment of the present invention, the HDC/MPU 23 performs TFC depending on the temperature change and the pressure change, which is produced by a barometric pressure change accompanying an altitude change. Environmental conditions involving a clearance change include humidity, in addition to, temperature and barometric pressure. The following descriptions are based on the assumption that a change in a temperature-compensated clearance is caused only by a pressure change. The HDD 1 has data, which include functional relationships, indicating the relationship between the temperature and the heater power and data, which include other functional relationships, indicating the pressure and the heater power; and, the HDC/MPU 23 calculates heater power depending on the temperature and the pressure from the data. Specifically, the heater power, P, to be applied to the heater 124 is expressed by the sum, P(t)+P(p), of a heater power, P(t), depending on the temperature and a heater power, P(p), depending on the pressure. Constant terms are incorporated in either term, which include formulae, of P(t) and P(p); and, the coefficients of the formulae in the terms may be varied depending on the environmental conditions such as temperature and pressure, the head-slider 12, or radial position of the head-slider 12. Specifically, the heater power P is expressed by the following formula:

$$P=(TDP \times \text{eff[DEFAULT]} - \text{Target} - dt \times t\_comp - dp \times p\_comp)/\text{eff}. \quad \text{(Formula 1)}$$

With further reference to FIG. 2, in accordance with an embodiment of the present invention, in the above formula, eff is heater power efficiency; eff[DEFAULT] is the heater power efficiency under the default conditions. TDP is the heater power at which a head-slider 12 contacts a magnetic-recording disk 11 under the default conditions; Target, the target clearance; dt, the amount of change in temperature from the default condition; t_comp, the rate of change in clearance for the temperature; dp, the amount of change in pressure from the default condition; and p_comp, the rate of change in clearance for the pressure. The signs of t_comp and p_comp are opposite to one another. TDP, t_comp, and p_comp typically vary depending on the radial position. Typically, the default conditions are environmental conditions of 30° C., which is room temperature, and 1 atmosphere (atm), which corresponds to an altitude of 0 meters (m) above sea level. As subsequently described herein, determination of a change in each variable with reference to the default conditions has the same meaning as determination of a respective value of each variable.

With further reference to FIG. 2, in accordance with an embodiment of the present invention, the HDD 1 has a temperature sensor 17 and the HDC/MPU 23 determines a heater power value, P(t), corresponding to a temperature from a sensed temperature and implemented functions. In an embodiment of the present invention, for purposes of the present discussion, the HDD 1 includes a temperature sensor 17, but does not include the barometric pressure sensor to reduce the number of components, which are considered in the present discussion. Therefore, the HDC/MPU 23 measures a clearance, which is indicative of a clearance change, to determine a pressure, which is indicative of a pressure change, in a pressure measurement.

With further reference to FIG. 2, in accordance with an embodiment of the present invention, the clearance varies depending on the pressure. Hence, in a pressure measurement, the HDC/MPU 23 measures a clearance and determines a pressure change, dp, from the clearance change. Since the clearance also varies depending on the temperature, the HDC/MPU 23 compensates for, for example, by eliminating, a clearance change caused by a temperature change from a measured clearance change, which is the difference from the default value, to calculate a clearance change caused by a pressure change. As described above, providing default conditions including specific default temperature and pressure and a default clearance under the default conditions allows the changes in the variables to be associated with the current values.

With further reference to FIG. 2, in accordance with an embodiment of the present invention, a temperature-compensated clearance change indicates a pressure change. The HDC/MPU 23 controls the heater power, P, depending on the pressure change, which is the pressure change from the default conditions, indicated by a clearance change. Specifically, as expressed in the aforementioned Formula 1, the HDD 1 has data, which is provided by a functional relationship, indicating the relationship between the pressure change, dp, expressed by the clearance change and the heater power, P; and, the HDC/MPU 23 determines a heater power for the pressure in accordance with the functional relationship and a measured pressure change.

With further reference to FIG. 2, in accordance with another embodiment of the present invention, the HDD 1 determines a clearance, or alternatively, a clearance change, from the default clearance using read-back signals of the head-slider 12. More specifically, the HDD 1 determines a clearance from the resolution, based on frequency components, of read-back signals. For example, the resolution may be expressed by the ratio between a specific low-frequency component and a high-frequency component in a read-back signal. There are some calculated values from the amplitude of read-back signals to determine, which is to measure, a pressure change, or alternatively, a clearance change, caused by the pressure change; the determination of a clearance change using a resolution is one of the most accurate methods. As the clearance decreases, the amplitude of the high-frequency component in read-back signals increases to increase the resolution.

With further reference to FIG. 2, in accordance with another embodiment of the present invention, with an appropriate linear transformation applied to a resolution, a clearance may be expressed by a linear function of the resolution. Typically, linear functions relating the resolution to the clearance are different in each head-slider 12. The relationship between the resolution and the clearance for each head-slider 12 is determined in a test operation in manufacturing the HDD 1; and, control parameters in accordance with the relationship are registered in the HDD 1.

With further reference to FIG. 2, in accordance with another embodiment of the present invention, the HDC/MPU 23 may determine a resolution by analyzing read-back signals and calculating the ratio between the high-frequency signal gain, which is associated with the amplitude of the read-back signal, and the low-frequency signal gain, which is also associated with the amplitude of the read-back signal. However, the HDC/MPU 23 includes additional functions besides functions for normal operation in order to execute the process.

Moreover, the MPU utilizes much process time in performing the process. Therefore, in an embodiment of the present invention, a resolution is measured using functions implemented in the HDD 1. The RW channel 21 has the function to modulate read-back waveforms of read-back signals to accurately extract data from read-back signals. The RW channel 21 performs the waveform shaping using digital filters, as is known in the art.

With further reference to FIG. 2, in accordance with another embodiment of the present invention, among digital filters implemented in the RW channel 21, a digital filter, for example, an adaptive cosine filter, to correct the frequency components in read-back signals is known in the art. The RW channel 21 corrects a tap value for this filter from the measured results of read-back signals. This correction value has a first-order relationship with the clearance, which is associated with the resolution, to indicate the resolution. The HDC/MPU 23 may determine the clearance change by referring to the correction value, which is subsequently referred to herein by the term of art, "Kgrad." A test operation in manufacturing the HDD 1 determines the relationship between Kgrad and the clearance for each head-slider 12. In the following description, the HDC/MPU 23 determines a clearance, or alternatively, a clearance change, by referring to Kgrad, which is one of the channel parameters and is equivalent to the resolution; but, the HDC/MPU 23 may use other channel parameters indicating the resolution. For example, if the RW channel 21 has a digital filter to restore a specific pattern of read-back signals into a standard pattern, the HDC/MPU 23 may use a correction value of a resolution component in correction coefficients for taps in the digital filter to determine the clearance. The coefficients and the constants in the functions, from the right side, of Formula 1 are determined in the test operation in manufacturing the HDD 1. Namely, the test operation in manufacturing the HDD 1 determines the relationship between the heater power and the clearance, the relationship between the temperature and the clearance, and the relationship between the temperature-compensated Kgrad, namely the pressure, and the clearance, and registers data indicating these relationships in the HDD 1. Kgrad varies depending on the variation of characteristics of the RW channel 21 with temperature, as well as the clearance variation caused by temperature variation. The temperature compensation by Kgrad is performed for these variations together. The HDC/MPU 23 uses these preset data to determine an appropriate heater power value from a temperature sensed by the temperature sensor 17 and a measured Kgrad, which is associated with a measured pressure.

With further reference to FIG. 2, in accordance with another embodiment of the present invention, the HDC/MPU 23 may obtain Kgrad from the RW channel 21 under arbitrarily changed circumstances. However, pressure does not change during operation like temperature; typically the pressure is constant after a start-up. Therefore, in an embodiment of the present invention, the HDC/MPU 23 controls the heater power in accordance with temperature variation after a start-up, but measures the pressure, associated with Kgrad, only in the initial setting operation, for example, in a power-on reset (POR) operation, at the start-up, and performs TFC assuming that the pressure during the operation is equal to the pressure at the start-up. Note that the HDC/MPU 23 may measure the pressure using Kgrad, which is associated with a clearance, during operation after the POR to control the heater power in accordance with pressure variation. The relationship between Kgrad, the clearance, and the pressure may be expressed by linear functions, which is next described.

Figure 3:
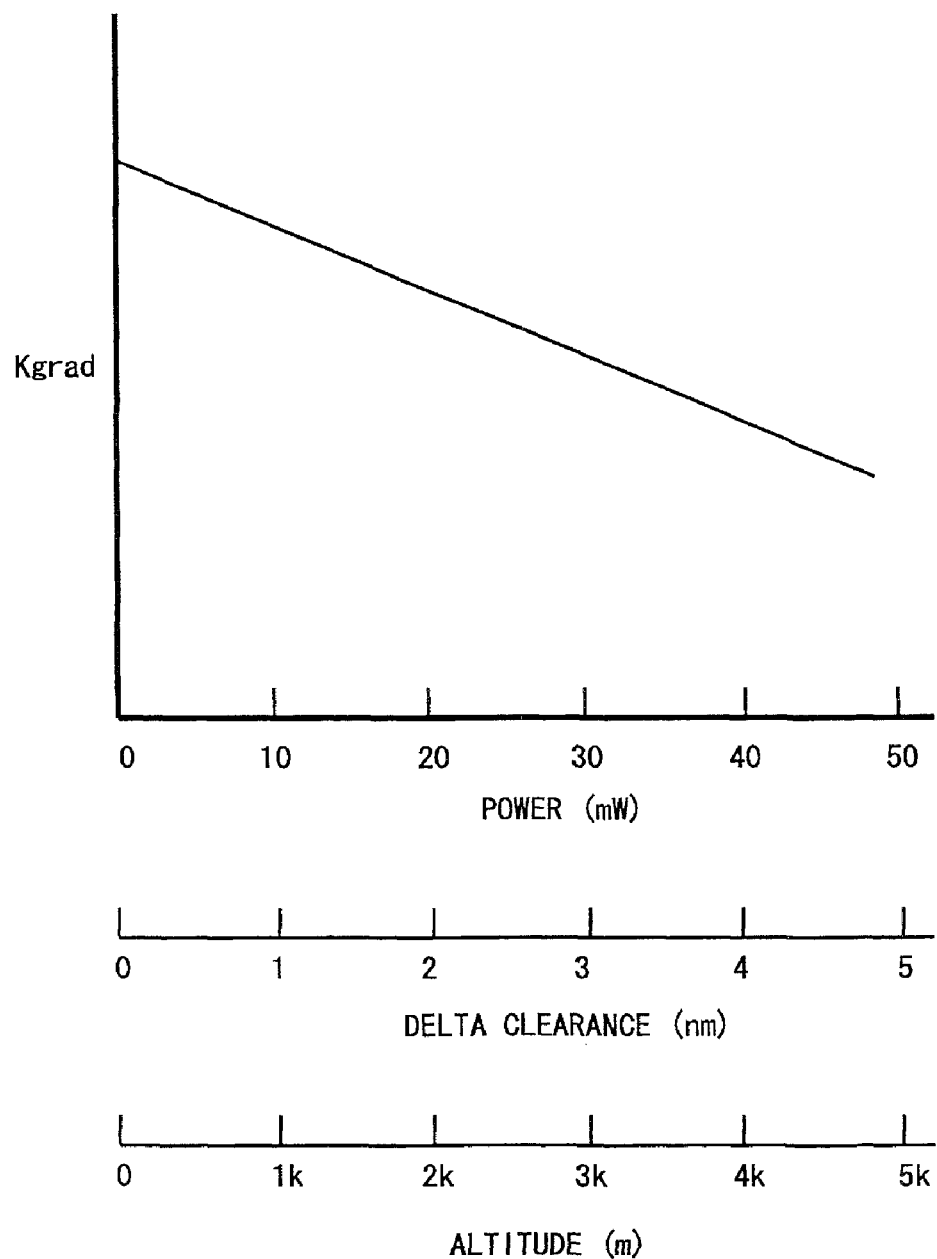
FIG. 3 is a plot illustrating the relationship between Kgrad, and each of: the clearance, the heater power, and the barometric pressure, which is measured in units of altitude, in accordance with an embodiment of the present invention.

With reference now to FIG. 3, in accordance with an embodiment of the present invention, a plot is shown that schematically illustrates the relationship between Kgrad, the clearance, the heater power, and the barometric pressure, associated with altitude. In the plot of FIG. 3, the altitude is used instead of the barometric pressure. The temperature is assumed to be constant. As shown in FIG. 3, each of the variables has a linear relationship with each other. Accordingly, the HDC/MPU 23 may directly determine any of the variables from other variables; and, any of the variables may be used to express the other variables. The clearance change, associated with the clearance, may be expressed by, for example, heater power, physical clearance in nanometers (nm), or Kgrad, each of which is a variable to be measured corresponding to the clearance. The functions which express the relationship between the variables in FIG. 3 are determined and implemented in an HDD 1 in the test operation in manufacturing the HDD 1. The HDC/MPU 23 measures Kgrad to calculate the current physical clearance in nanometers (nm), and the altitude in kilometers (km), associated with the barometric pressure. Hereinbelow, measurement of a pressure change is subsequently described, but this is the equivalent to measurement of the altitude.

With further reference to FIG. 3, in accordance with an embodiment of the present invention, the HDC/MPU 23 reads a data string for Kgrad measurement on the magnetic-recording disk 11 with a read element 32 to measure a Kgrad. The data string for Kgrad measurement is the data string for clearance measurement. The HDC/MPU 23 executes computations on the measured Kgrad using the preset functions to calculate the pressure difference, dp, between the default, for example, a pressure of 1 atm, and the current pressure. The data string for Kgrad measurement is preliminarily written on the magnetic-recording disk 11 in manufacturing the HDD 1. The HDC/MPU 23 writes the data string for Kgrad measurement with a write element 31. In manufacturing, environmental factors such as temperature, pressure, setting conditions of the HDD 1, and similar factors are appropriately controlled so that the data string for Kgrad measurement may be written under proper conditions to achieve a data string for Kgrad measurement with good properties. In an embodiment of the present invention, a data track to be used in the Kgrad measurement is a data track with good properties for Kgrad measurement. Hence, in an embodiment of the present invention, the data track is not used in user data recording and is located in an area with no access from a host, which eliminates deterioration in properties of the data track caused by repetitive overwrites.

With further reference to FIG. 3, in accordance with an embodiment of the present invention, the HDC/MPU 23 performs a deterioration check on the data string for Kgrad measurement. The major cause of the deterioration in the data string for Kgrad measurement is thermal demagnetization. The HDC/MPU 23 writes a data string for deterioration check onto the magnetic-recording disk 11 with the write element 31. The data string for deterioration check is the data string which may be used in Kgrad measurement; and, in an embodiment of the present invention, the data string for deterioration check is the same data string, which possesses an identical digit arrangement, as the data string for Kgrad measurement. The HDC/MPU 23 measures Kgrad using the data string for deterioration check, in addition to, the data string for Kgrad measurement. The HDC/MPU 23 compares the measured results of these two data strings to check the deterioration of the data string for Kgrad measurement.

With further reference to FIG. 3, in accordance with an embodiment of the present invention, if the two measured results are considerably different, the degree of deterioration of the data string for Kgrad measurement may be considered to have exceeded an acceptable level. As described herein, an acceptable level may also be referred to as a criteria. Specifically, if the difference in the measured results between the two the data strings exceeds a threshold, the HDC/MPU 23 determines that the data string for Kgrad measurement has deteriorated, which means that the data string for Kgrad measurement is outside of tolerance. When the data string for Kgrad measurement has deteriorated, continued use of the measured values in the data string for Kgrad measurement prevents accurate measurement of the clearance change, associated with the pressure change. Then, the HDC/MPU 23 corrects the computations for calculating a clearance change, associated with the pressure change, from a Kgrad using the data string for Kgrad measurement. Otherwise, the HDC/MPU 23 writes a new data string for Kgrad measurement and then performs pressure measurements, associated with clearance measurements, using the new data string for Kgrad measurement.

Figure 4:
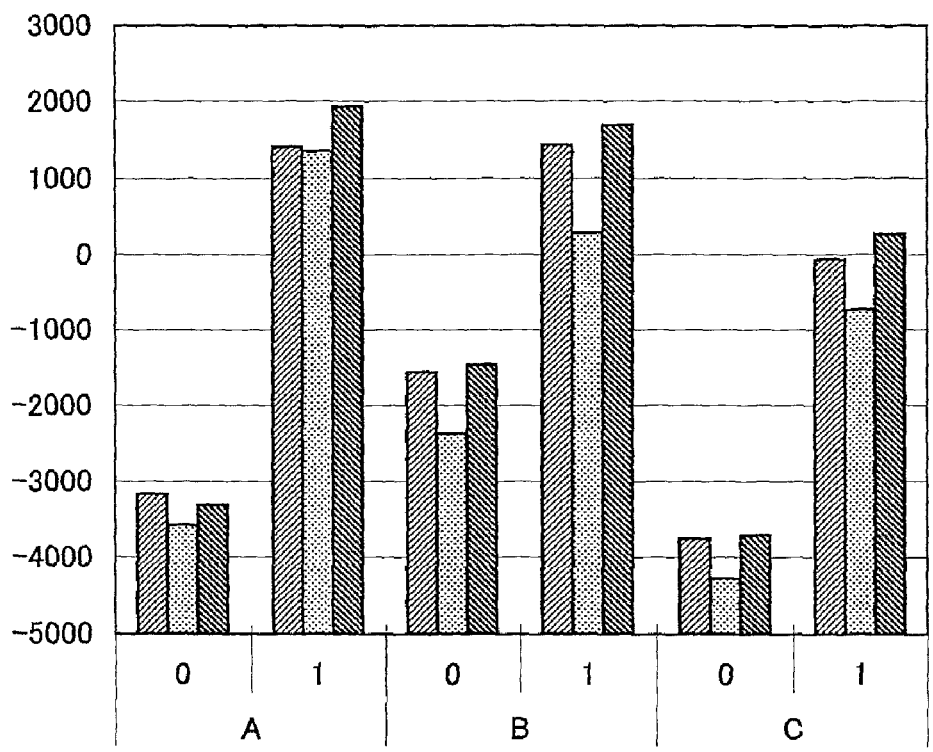
FIG. 4 is a bar chart illustrating an example of deterioration of a data string for Kgrad measurement, in accordance with an embodiment of the present invention.

With reference now to FIG. 4, in accordance with an embodiment of the present invention, a bar chart is shown. The bar chart illustrates: a Kgrad measured using a data string for Kgrad measurement before deterioration by thermal demagnetization; a Kgrad measured after thermal demagnetization; and, a Kgrad measured using a new rewritten data string for Kgrad measurement. In FIG. 4, A, B, and C on the X axis represent different HDDs, and 0's and 1's represent respective head numbers within the HDDs. The Y axis represents Kgrad. Three values for each head are indicated as bars; the left bar indicates Kgrad before the thermal demagnetization; the middle bar indicates Kgrad after the thermal demagnetization; and, the right bar indicates Kgrad with a new data string. As understood from FIG. 4, the Kgrad in a data string for Kgrad measurement is reduced by thermal demagnetization. The Kgrad in a new data string for Kgrad measurement indicates approximately the same value as the Kgrad in a previous data string for Kgrad measurement before the thermal demagnetization. In an embodiment of the present invention, the HDC/MPU 23 measures the barometric pressure in the POR operation. For accurate pressure measurement, in an embodiment of the present invention, the data string for Kgrad measurement is checked before every measurement.

Figure 5:
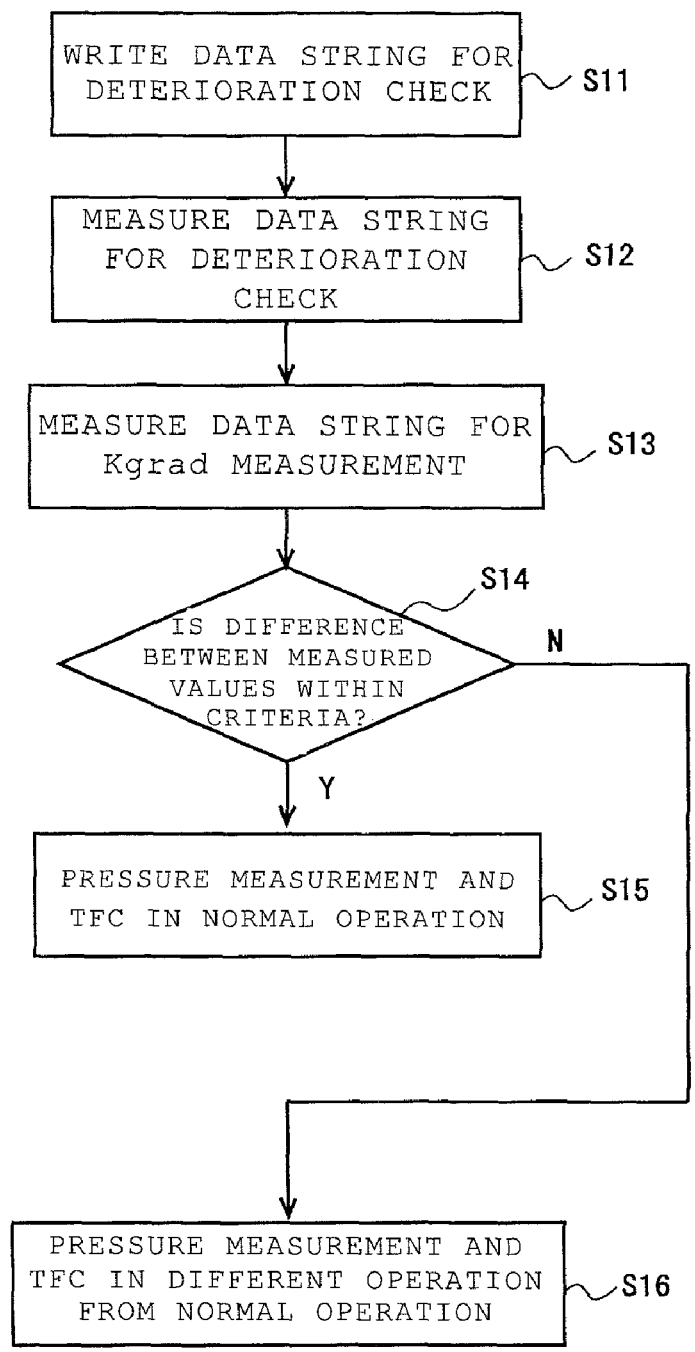
FIG. 5 is a flowchart depicting an example process for pressure measurement that employs TFC, in accordance with an embodiment of the present invention.

With reference now to FIG. 5, in accordance with an embodiment of the present invention, a flowchart is shown. The flowchart illustrates the process for making a pressure measurement with a check on the data string for Kgrad measurement. First, at S11, at a POR, the HDC/MPU 23 writes a data string for deterioration check onto a magnetic-recording disk 11 with a selected head-slider 12. The head-slider 12 to be selected is the head corresponding to the recording surface on which the data string for Kgrad measurement has been written. Subsequently, at S12, the HDC/MPU 23 reads the data string for deterioration check with the head-slider 12 to measure the data string for deterioration check. The HDC/MPU 23 stores the measured results into a RAM 24. Next, at S13, the HDC/MPU 23 reads the data string for Kgrad measurement with the selected head-slider 12 to measure the data string for Kgrad measurement. At S14, the HDC/MPU 23 compares the measured results on the data string for Kgrad measurement with the measured results on the data string for deterioration check and determines whether the difference exceeds an acceptable level. As described herein, an acceptable level may also be referred to as a criteria, as shown in FIG. 5. If the difference between the measured results is within acceptance, which is a range defined by thresholds, the HDC/MPU 23 determines that the data string for Kgrad measurement are normal; and, at S15, performs a normal pressure measurement and a normal TFC based on the measured results. If the difference between the measured results exceeds an acceptable level, the HDC/MPU 23 determines that the data string for Kgrad measurement has deteriorated and is abnormal; and, at S16, measures a clearance change and a pressure change with a different method from the normal operation and performs a TFC based on the pressure. Specifically, the HDC/MPU 23 corrects the clearance, or alternatively, the computations for calculating the pressure change, or writes a new data string for Kgrad measurement and uses the new data string for Kgrad measurement. Depending on the design, the determination of deterioration of the data string for Kgrad measurement may be made at every specific number of pressure measurements, or depending on the circumstances, other than every pressure measurement.

With further reference to FIG. 5, in accordance with an embodiment of the present invention, to accurately detect the deterioration of the data string for Kgrad measurement, in one embodiment of the present invention, appropriate measured results, which are measured values, are selected for comparison from the two data strings. The HDC/MPU 23 may obtain a measured Kgrad directly from the RW channel 21. If the measured Kgrad does not depend on, the contents of, the data string, or alternatively, the condition for writing the data string, which may also be referred to as a requirement for writing the data string, but only the clearance on reading the data string, the HDC/MPU 23 may use the measured Kgrad as a value for measurement to be used in deterioration determination without further modification of the measured Kgrad. As described herein, a condition may also be referred to as a requirement. Under such circumstances, the HDC/MPU 23 compares a measured Kgrad of the data string for Kgrad measurement with that of the data string for deterioration check to accurately determine the deterioration of the data string for Kgrad measurement. If the measured Kgrad depends on the data string, the data string for Kgrad measurement may be identical to the data string for deterioration check. As subsequently described herein, it is assumed that identical data strings are used as these data strings.

With further reference to FIG. 5, in accordance with an embodiment of the present invention, in the POR, conditions for reading the data string, which may be referred to as a requirements for reading the data string, for Kgrad measurement and reading the data string for deterioration check are substantially the same. Namely, the HDD 1 reads two data strings with the same head-slider 12 at the same temperature and at the same pressure. Accordingly, if the measured Kgrad does not substantially depend on the conditions for writing the data strings, the HDC/MPU 23 may accurately determine the deterioration by comparing the measured Kgrad's in the two data strings. If the measured Kgrad depends on the conditions for writing the data strings, the HDC/MPU 23 uses values for measurement which may compensate for the conditions. The conditions for writing the data string for deterioration check change with the use conditions of the HDD 1 and are not constant. Accordingly, the conditions for writing the data string for Kgrad measurement and for writing the data string for deterioration check are generally different. Specifically, between those write conditions, the temperature and the pressure are different. The clearance changes with temperature and pressure; depending on the clearance at a write, the measured Kgrad's of a data string may be different as much as the difference may affect the deterioration check.

With further reference to FIG. 5, in accordance with an embodiment of the present invention, for accurate determination of the deterioration of the data string for Kgrad measurement, the HDC/MPU 23 uses a value corrected appropriately for the Kgrad measurement as a value for measurement to be compared with for the deterioration determination. If the change in the measured Kgrad caused by a pressure change is small, the effects may be ignored; but, for more accurate determination, in an embodiment of the present invention, a value is used that may correct the measured Kgrad so as to compensate for the both changes in a measured Kgrad caused by a temperature change and a pressure change.

With further reference to FIG. 5, in accordance with an embodiment of the present invention, a method is used in which the HDC/MPU 23 calculates a clearance expressed by the current physical distance from the measured Kgrad and uses the result. The clearance expressed by the physical distance is a value which is obtained from a corrected measured Kgrad for compensating for the temperature and pressure changes since the data string write. As explained with reference to FIG. 3, the relationship between the measured Kgrad and the clearance may be approximated by a linear function. For example, the relationship between the clearance, C, and the measured Kgrad, K, with respect to the data string for Kgrad measurement may be expressed by:

$$C = a1 \times K + b1. \quad \text{(Formula 2)}$$

On the other hand, the relationship between the clearance, C, and the measured Kgrad, K, with respect to the data string for deterioration check may be expressed by:

$$C = a2 \times K + b2. \quad \text{(Formula 3)}$$

In the formulae, typically, a1 and a2 are different values, and also, b1 and b2 are different values. These values are determined in manufacturing an HDD 1 and preset in the HDD 1. The HDC/MPU 23 obtains these values from a non-volatile memory such as a magnetic-recording disk 11 and a ROM, and calculates respective clearances from a measured Kgrad of the data string for Kgrad measurement and a measured Kgrad of the data string for deterioration check. The clearances are expressed as physical distance in nanometers (nm).

With further reference to FIG. 5, in accordance with an embodiment of the present invention, the HDC/MPU 23, in manufacturing an HDD 1, determines a1 and b1 in Formula 2 from measured Kgrad's at different clearances in the same data string for Kgrad measurement. Specifically, after writing a data string for Kgrad measurement, the HDC/MPU 23 measures Kgrad of the data string for Kgrad measurement at a plurality of different clearances. The HDC/MPU 23 changes the clearance by controlling the heater power and measures Kgrad at a plurality of different clearances. Moreover, the HDC/MPU 23 measures touch down power (TDP) corresponding to each clearance. As to the relationship, given in units of nanometers per milliwatts (nm/mW), between the heater power, given in nanowatts (nW), and the clearance given in nanometers (nm), the identical relational expression may be applied to head-sliders that possess an identical design. Hence, the HDC/MPU 23 may calculate a clearance in nm from the TDP at each clearance where Kgrad is measured. From the relationship between the plurality of measured Kgrad's and the clearance in nm, the HDC/MPU 23 calculates coefficients a1 and b1 in Formula 2 which indicates the relationship between them.

With further reference to FIG. 5, in accordance with an embodiment of the present invention, a measurement for determining the coefficients a2 and b2 in Formula 3 is different from the measurement for determining the coefficients for a1 and b1 in Formula 2. The HDC/MPU 23 writes a data string for deterioration check and measures the Kgrad at different clearances to determine the relationship, determined by the coefficients a2 and b2, between the clearance in nm and the measured Kgrad. The HDC/MPU 23 measures Kgrad at different clearances with a controlled heater power. Specifically, the HDC/MPU 23 writes a data string for deterioration check at different heater power values, associated with different clearances, and measures their Kgrad at a constant temperature. Similar to the determination of Formula 2, the HDC/MPU 23 calculates the clearance in nm corresponding to each heater power value at which Kgrad was measured. From the relationship between the plurality of measured Kgrad's and the clearances in nm, the HDC/MPU 23 calculates the coefficients a2 and b2 of Formula 3 indicating the relationship between them.

With further reference to FIG. 5, in accordance with an embodiment of the present invention, in this way, the HDC/MPU 23 calculates the clearance in physical distance in nm, which is the measured value independent of the conditions, for the clearance, for writing a data string for deterioration check, from measured Kgrad's of the data string for Kgrad measurement and the data string for deterioration check using the relational formulae 2 and 3 determined in manufacture. If there is a difference exceeding the acceptable level between the clearances of the two data strings, the HDC/MPU 23 determines that the data string for Kgrad measurement has deteriorated. The acceptable level may be defined with a threshold of the measured results. The threshold may be, for example, a constant, or alternatively, a ratio of measured results. For example, if the difference between the clearances in nm of the two data strings is greater than the threshold of 1 nm, the HDC/MPU 23 determines that the data string for Kgrad measurement has deteriorated. Moreover, if the ratio of the difference between the clearances in nm based on the two data strings and the clearance in nm based on the data string for deterioration check exceeds a threshold, the HDC/MPU 23 determines that the data string for Kgrad measurement has deteriorated.

With further reference to FIG. 5, in accordance with an embodiment of the present invention, in this regard, the measured Kgrad of the data string for deterioration check has larger variation than that of the data string for Kgrad measurement. Hence, if a measured value of the data string for deterioration check showed a big difference from a measured value of the data string for Kgrad measurement, the conclusion from the result that the data string for Kgrad measurement has deteriorated may be wrong. Then, in an embodiment of the present invention, the HDC/MPU 23 determines the deterioration of the data string for Kgrad measurement using a plurality of measured values. Specifically, the HDC/MPU 23 stores the measured values, which are the measured clearances, based on the data string for deterioration check and the data string for Kgrad measurement at a plurality of PORs. When the HDC/MPU 23 obtains a specific number of measured results, the HDC/MPU 23 performs determination of deterioration of the data string for Kgrad measurement from the measured results. For example, if the difference between all of the obtained measured results exceeds the acceptable level, the HDC/MPU 23 determines that the data string for Kgrad measurement has deteriorated. Otherwise, if the difference between the averages of a plurality of measured results exceeds the acceptable level, the HDC/MPU 23 determines that the data string for Kgrad measurement has deteriorated. In contrast, if the HDD 1 includes a plurality of head-sliders 12, measurement on the data string for deterioration check and the data string for Kgrad measurement may be made with a plurality of head-sliders 12 at one POR. Then, the HDC/MPU 23 may obtain a plurality of measured results, which are clearances, at one POR. If the number of head-sliders 12 is enough for accurate determination of deterioration of the data string for Kgrad measurement, the HDC/MPU 23 performs determination of deterioration of the data string for Kgrad measurement from the plurality of measured results at every POR.

With further reference to FIG. 5, in accordance with an embodiment of the present invention, a method for determining deterioration of the data string for Kgrad measurement may be conformed to the measurement of a pressure change. For example, in an embodiment of the present invention, when the HDC/MPU 23 measures a pressure change using a measured Kgrad with a selected head-slider 12, the determination of deterioration is performed with a plurality of values measured in a plurality of PORs. On the other hand, in another embodiment of the present invention, when the HDC/MPU 23 measures a pressure change using measured Kgrad's, or alternatively, the average thereof, with a plurality of, or all of, the head-sliders 12, the HDC/MPU 23 performs the determination of deterioration by measuring the data string for deterioration check with the plurality of head-sliders.

With further reference to FIG. 5, in accordance with an embodiment of the present invention, for accurate determination of deterioration of the data string for Kgrad measurement, the data string for Kgrad measurement and the data string for deterioration check are written close to each other. On the other hand, in another embodiment of the present invention, for accurate measurement of data strings, the effects due to other data writes are avoided. In an embodiment of the present invention, the data string for deterioration check is written in the same zone and on a track which is several tracks away from the data string for Kgrad measurement. A zone is an area of the same recording frequency.

With further reference to FIG. 5, in accordance with an embodiment of the present invention, if the HDC/MPU 23 determines that the deterioration of the data string for Kgrad measurement has not exceeded the acceptable level, the HDC/MPU 23 calculates a pressure change from the data string for Kgrad measurement in a normal operation. Namely, the HDC/MPU 23 uses a measured Kgrad of the data string for Kgrad measurement without further modification to the measured Kgrad to calculate the pressure change, associated with altitude. The HDC/MPU 23 performs a temperature compensation on the measured Kgrad to eliminate a change of the measured Kgrad caused by a temperature change. In addition, the HDC/MPU 23 substitutes the difference, dK, between the default value, which is the pressure at the default, and a temperature-compensated measured Kgrad to a preset function to determine a pressure change, dp, which is the difference between the default value and the current pressure. In general, the function for calculating a pressure change may be expressed by a linear function as follows:

$$dp = a3 \times dK. \quad \text{(Formula 4)}$$

With further reference to FIG. 5, in accordance with an embodiment of the present invention, on the other hand, if the HDC/MPU 23 determines that the deterioration of the data string for Kgrad measurement has exceeded the acceptable level, the HDC/MPU 23 performs operations different from a normal operation to measure the pressure. Specifically, the HDC/MPU 23 rewrites to update the data string for Kgrad measurement, or alternatively, calculates the pressure from a measured Kgrad with other computation methods. In the case of rewrite, the HDC/MPU 23 writes a new data string for Kgrad measurement on the same track as the deteriorated data string for Kgrad measurement. In an embodiment of the present invention, the HDC/MPU 23 performs an AC erasure of the previous data string for Kgrad measurement with a write element 31 before writing a new data string for Kgrad measurement. The new data string for Kgrad measurement is the identical data to the previous data string for Kgrad measurement. In an embodiment of the present invention, for accurate pressure measurement, associated with the Kgrad measurement, the new data string for Kgrad measurement is written under certain conditions. In an embodiment of the present invention, the HDC/MPU 23 writes the new data string for Kgrad measurement if the predetermined conditions are satisfied. For example, at an ultra cold temperature, the recording layer may not be properly magnetized by a recording magnetic field of the write element 31. Hence, in an embodiment of the present invention, the conditions for writing the new data string for Kgrad measurement include that the temperature sensed by a temperature sensor 17 is within a preset range. Moreover, in an embodiment of the present invention, for an accurate writing of the data string for Kgrad measurement, the conditions include that the servo stability of a head-slider is at a specific level. Hence, for example, the HDC/MPU 23 uses a condition that the integrated value ($\Sigma$) of position error signals (PESs), which indicate a position error from a target position in values of servo signals, of a head-slider 12 does not exceed a threshold as a condition for writing a new data string for Kgrad measurement.

With further reference to FIG. 5, in accordance with an embodiment of the present invention, in general, if the data string for Kgrad measurement has deteriorated, a measured Kgrad becomes smaller, but the variation in measured values do not become large. Accordingly, the HDC/MPU 23 may use the old data string for Kgrad measurement without being rewritten by correcting the measured values properly. As shown in Formulae 2 and 3, the measured Kgrad and the clearance may be related by a linear function. Deterioration of the data string for Kgrad measurement causes the measured Kgrad at the same clearance to be smaller. This results in decrease in the constant terms b1 and b2 in Formulae 2 and 3. That change may be compensated for by a correction to add a constant term b3 to the right side of the Formula 4. This is because that even if the data string for Kgrad measurement has deteriorated, the relationship between the pressure change and the clearance change does not change. A pressure change using a measured Kgrad in a deteriorated data string for Kgrad measurement may be calculated according to the following corrected formula:

$$dp = a3 \times dK + b3. \quad \text{(Formula 5)}$$

With further reference to FIG. 5, in accordance with an embodiment of the present invention, this is the same as a correction to add a constant term to a measured Kgrad in a deteriorated data string for Kgrad measurement. The HDC/MPU 23 has obtained measured clearances for the data string for Kgrad measurement and the data string for deterioration check. Accordingly, the difference between these measured clearances may be used to calculate the correction value for the data string for Kgrad measurement. For example, the difference in clearance in between these two data strings may be used as a correction value for the clearance in the data string for Kgrad measurement. The clearance, the measured Kgrad, and the pressure may be related with each other through functions. Accordingly, determination of a correction value for the clearance, which is a correction value for computations in calculating the clearance, leads to determination of correction values for a measured Kgrad and for calculating the pressure. However, if the difference in clearance between the two data strings is used as the correction value without change, the correction may be too excessive. Then, in an embodiment of the present invention, tens of percent of the difference as a portion of the difference is used as the correction value. Moreover, in an embodiment of the present invention, since the HDC/MPU 23 has clearance values at a plurality of measurements, the correction value is calculated using the plurality of values.

With further reference to FIG. 5, in accordance with an embodiment of the present invention, the HDC/MPU 23 selects a plurality of values from the stored clearance values and calculates the average thereof, which are the average of the clearances in the data string for Kgrad measurement and the average of the clearances in the data string for deterioration measurement. After calculation of the products of the difference between the averages and a predetermined specific constant, which is a rate, the result is used as the correction value for the clearance in the data string for Kgrad measurement.

With further reference to FIG. 5, in accordance with another embodiment of the present invention, for determination of deterioration of the data string for Kgrad measurement, the HDC/MPU 23 may use verification by touch downs as a determination condition. This allows the determination to be more accurate. Specifically, if measured results in the two data strings indicate deterioration which has exceeded the tolerance for the data string for Kgrad measurement, the HDC/MPU 23 measures a touch down power (TDP), which allows the HDC/MPU 23 to ascertain the current clearance. If there is difference between the measured clearance based on touch down and the measured clearance in the data string for Kgrad measurement, the HDC/MPU 23 determines that the data string for Kgrad measurement is abnormal. In an embodiment of the present invention, the difference in clearance is used in calculation of the correction value. This is because that the clearance measurement based on touch down is more accurate than the clearance measurement using the data string for deterioration check.

As set forth above, embodiments of the present invention have been described by way of examples; but, embodiments of the present invention are not limited to the above examples. A person skilled in the art may easily modify, add, and convert each element in the above examples within the spirit and scope of embodiments of the present invention. For example, embodiments of the present invention may be applied to HDDs having a clearance control mechanism other than TFC, such as a piezo element. Alternatively, embodiments of the present invention may be applied to HDDs without a clearance control mechanism, or alternatively, to disk drives other than HDDs.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for measuring a change of a clearance between a head and a disk, said method comprising;
reading a preliminarily written data string for clearance measurement on a disk to obtain a first measured value of Kgrad corresponding to a clearance, said clearance determined by a first linear dependence on said first measured value of Kgrad;
writing a new data string for deterioration check onto said disk and reading said data string for deterioration check to obtain a second measured value of Kgrad corresponding to a second clearance, said second clearance determined by a second linear dependence on said second measured value of Kgrad;
determining a deterioration of said data string for clearance measurement from a difference between said first measured value of Kgrad and said second measured value of Kgrad;
measuring a clearance change using said data string for clearance measurement by a normal operation if said determination is that said data string for clearance measurement has not deteriorated;
measuring a clearance change by an operation different from said normal operation if said determination is that said data string for clearance measurement has deteriorated; and
wherein Kgrad comprises a corrected tap value of an adaptive cosine filter implemented in a read/write channel of a hard-disk drive; and
wherein said first linear dependence and said second linear dependence are characterized by coefficients having different values, said values of said coefficients stored in a non-volatile memory of said hard-disk drive.

2. The method of claim 1, wherein, if said determination is that said data string for clearance measurement has deteriorated, computations for calculating said clearance change using said data string for clearance measurement are corrected and said corrected computations are used in said measuring said clearance change.

3. The method of claim 2, wherein said computations are corrected so as to compensate for a portion of said difference between said first measured value and said second measured value.

4. The method of claim 1, wherein, if said determination is that said data string for clearance measurement has deteriorated, said new data string for clearance measurement is written onto said disk.

5. The method of claim 4, wherein, if specific write conditions have been satisfied, said new data string for clearance measurement is written onto said disk.

6. The method of claim 1, wherein said first measured value and said second measured value are independent of said clearance in said writing of said data string for clearance measurement and said clearance in said writing of said data string for deterioration check.

7. The method of claim 6, wherein said first measured value and said second measured value indicate clearances in physical distance.

8. The method of claim 1, wherein said determination of said deterioration is performed by using a plurality of said first measured values and a plurality of said second measured values.

9. The method of claim 1, further comprising:
verifying said deterioration of said data string for clearance measurement by measuring a clearance with said head in contact with said disk.

10. A disk drive comprising:
a write element configured to write a new data string for deterioration check onto a disk;
a read element configured to read a preliminarily written data string for clearance measurement on said disk and said data string for deterioration check;

a moving mechanism that supports a head comprising said write element and said read element and configured to move said head in proximity to a recording surface of said disk; and a controller configured to control said moving mechanism and said head;

wherein said controller is configured to obtain a first measured value of Kgrad corresponding to a clearance based on read-back signals in said data string for clearance measurement, said clearance determined by a first linear dependence on said first measured value of Kgrad; said controller is configured to obtain a second measured value of Kgrad corresponding to a second clearance based on read-back signals from said data string for deterioration check, said second clearance determined by a second linear dependence on said second measured value of Kgrad; said controller is configured to determine a deterioration of said data string for clearance measurement by comparing said first measured value of Kgrad with said second measured value of Kgrad; said controller is configured to measure a clearance change using said data string for clearance measurement by a normal operation if said determination is that said data string for clearance measurement has not deteriorated; and, said controller is configured to measure a clearance change by an operation different from said normal operation if said determination is that said data string for clearance measurement has deteriorated; and wherein Kgrad comprises a corrected tap value of an adaptive cosine filter implemented in a read/write channel of a hard-disk drive; and wherein said first linear dependence and said second linear dependence are characterized by coefficients having different values, said values of said coefficients stored in a non-volatile memory of said hard-disk drive.

11. The disk drive of claim 10, wherein, if said controller determines that said data string for clearance measurement has deteriorated, said controller corrects computations for calculating a clearance change from said data string for clearance measurement and uses said corrected computations in said measuring said clearance change.

12. The disk drive of claim 11, wherein said controller corrects said computations so as to compensate for a portion of said difference between said first measured value and said second measured value.

13. The disk drive of claim 10, wherein, if said controller determines that said data string for clearance measurement has deteriorated, said controller writes a new data string for clearance measurement onto said disk with said write element.

14. The disk drive of claim 13, wherein, if specific write conditions have been satisfied, said controller writes said new data string for clearance measurement onto said disk with said write element.

15. The disk drive of claim 10, wherein said first measured value and said second measured value are independent of said clearance in said writing of said data string for clearance measurement and said clearance in said writing of said data string for deterioration check.

16. The disk drive of claim 15, wherein said first measured value and said second measured value indicate clearances in physical distance.

17. The disk drive of claim 10, wherein said controller is configured to perform said determination of said deterioration by using a plurality of said first measured values and a plurality of said second measured values.

18. The disk drive of claim 10, wherein said controller is configured to verify said deterioration of said data string for clearance measurement by measuring a clearance with said head in contact with said disk.

* * * * *